(12) United States Patent  
Dunne et al.

(10) Patent No.: US 9,234,492 B2
(45) Date of Patent: Jan. 12, 2016

(54) HYDROELECTRIC TURBINE TESTING METHOD

(75) Inventors: Paul Dunne, Dublin (IE); James Ives, Dublin (IE)

(73) Assignee: Openhydro IP Limited, Dublin (IE)

( * ) Notice: Subject to any disclaimer, the term of this patent is extended or adjusted under 35 U.S.C. 154(b) by 404 days.

(21) Appl. No.: 13/996,106

(22) PCT Filed: Dec. 22, 2011

(86) PCT No.: PCT/EP2011/073788
§ 371 (c)(1),
(2), (4) Date: Oct. 3, 2013

(87) PCT Pub. No.: WO2012/085200
PCT Pub. Date: Jun. 28, 2012

(65) Prior Publication Data
US 2014/0102189 A1    Apr. 17, 2014

(30) Foreign Application Priority Data

Dec. 23, 2010   (EP) ..................................... 10196786

(51) Int. Cl.
G01M 3/02       (2006.01)
F03B 11/00      (2006.01)
E02D 15/08      (2006.01)
F03B 13/26      (2006.01)
F03B 17/06      (2006.01)
G01M 10/00      (2006.01)

(52) U.S. Cl.
CPC .............. *F03B 11/008* (2013.01); *E02D 15/08* (2013.01); *F03B 13/264* (2013.01); *F03B 17/061* (2013.01); *G01M 10/00* (2013.01); *F05B 2240/931* (2013.01); *F05B 2260/83* (2013.01); *Y02E 10/28* (2013.01)

(58) Field of Classification Search
None
See application file for complete search history.

(56) References Cited

U.S. PATENT DOCUMENTS

| 228,467 | A | 6/1880 | Maclay |
| 928,536 | A | 7/1909 | Pino |
| 1,710,103 | A | 4/1929 | Nelson |
| 2,054,142 | A | 9/1936 | Sharp |
| 2,470,797 | A | 5/1949 | Thomas |
| 2,501,696 | A | 3/1950 | Souczek |
| 2,563,279 | A | 8/1951 | Rushing |
| 2,658,453 | A | 11/1953 | Walters |
| 2,782,321 | A | 2/1957 | Fischer |

(Continued)

FOREIGN PATENT DOCUMENTS

| CA | 2388513 | 8/2000 |
| CA | 2352673 | 1/2003 |

(Continued)

OTHER PUBLICATIONS

International Search Report completed Mar. 15, 2012, from corresponding International Application No. PCT/EP2011/073788.

*Primary Examiner* — Peter Macchiarolo
*Assistant Examiner* — Jermaine Jenkins
(74) *Attorney, Agent, or Firm* — Gardner, Linn, Burkhart & Flory, LLP

(57) ABSTRACT

A method of testing a hydroelectric turbine before the turbine is installed and secured on the seabed, in order to ensure that the turbine is operating as expected, the method involving securing the turbine to a vessel and displacing the vessel through water in order to effect rotation while monitoring one or more operating parameters of the turbine.

15 Claims, 1 Drawing Sheet

(56) References Cited

U.S. PATENT DOCUMENTS

| | | | |
|---|---|---|---|
| 2,792,505 A | 5/1957 | Baudry |
| 2,874,547 A | 2/1959 | Fiore |
| 3,078,680 A | 2/1963 | Wapsala |
| 3,209,156 A | 9/1965 | Struble, Jr. |
| 3,292,023 A | 12/1966 | Korber |
| 3,342,444 A | 9/1967 | Nelson |
| 3,355,998 A | 12/1967 | Roemisch |
| 3,384,787 A | 5/1968 | Schwartz |
| 3,422,275 A | 1/1969 | Braikevitch et al. |
| 3,477,236 A | 11/1969 | Burrus |
| 3,487,805 A | 1/1970 | Satterthwaite et al. |
| 3,708,251 A | 1/1973 | Pierro |
| 3,986,787 A | 10/1976 | Mouton, Jr. et al. |
| 3,987,638 A | 10/1976 | Burkhardt et al. |
| 4,095,918 A | 6/1978 | Mouton et al. |
| 4,163,904 A | 8/1979 | Skendrovic |
| 4,219,303 A | 8/1980 | Mouton, Jr. et al. |
| 4,274,009 A | 6/1981 | Parker, Sr. |
| 4,367,413 A | 1/1983 | Nair |
| 4,421,990 A | 12/1983 | Heuss et al. |
| 4,427,897 A | 1/1984 | Migliori |
| 4,496,845 A | 1/1985 | Ensign et al. |
| 4,523,878 A | 6/1985 | Richart et al. |
| 4,541,367 A | 9/1985 | Lindberg |
| 4,613,762 A | 9/1986 | Soderholm |
| 4,720,640 A | 1/1988 | Anderson |
| 4,740,711 A | 4/1988 | Sato et al. |
| 4,744,697 A | 5/1988 | Coppens |
| 4,744,698 A | 5/1988 | Dallimer et al. |
| 4,810,135 A | 3/1989 | Davenport et al. |
| 4,867,605 A | 9/1989 | Myers et al. |
| 4,868,408 A | 9/1989 | Hesh |
| 4,868,970 A | 9/1989 | Schultz et al. |
| 4,990,810 A | 2/1991 | Newhouse |
| 5,495,221 A | 2/1996 | Post |
| 5,592,816 A | 1/1997 | Williams |
| 5,606,791 A | 3/1997 | Fougere et al. |
| 5,609,441 A | 3/1997 | Khachaturian |
| 5,656,880 A | 8/1997 | Clark |
| 5,662,434 A | 9/1997 | Khachaturian |
| 5,715,590 A | 2/1998 | Fougere et al. |
| 5,800,093 A | 9/1998 | Khachaturian |
| 5,946,909 A * | 9/1999 | Szpur .................. F03B 17/061 |
| | | 415/7 |
| 5,998,905 A | 12/1999 | Fougere et al. |
| 6,039,506 A | 3/2000 | Khachaturian |
| 6,109,863 A | 8/2000 | Milliken |
| 6,166,472 A | 12/2000 | Pinkerton |
| 6,168,373 B1 | 1/2001 | Vauthier |
| 6,232,681 B1 | 5/2001 | Johnston et al. |
| 6,242,840 B1 | 6/2001 | Denk et al. |
| 6,300,689 B1 | 10/2001 | Smalser |
| 6,367,399 B1 | 4/2002 | Khachaturian |
| 6,406,251 B1 | 6/2002 | Vauthier |
| 6,409,466 B1 | 6/2002 | Lamont |
| 6,445,099 B1 | 9/2002 | Roseman |
| 6,476,709 B1 | 11/2002 | Wuidart et al. |
| 6,612,781 B1 | 9/2003 | Jackson |
| 6,648,589 B2 | 11/2003 | Williams |
| RE38,336 E | 12/2003 | Williams |
| 6,729,840 B2 | 5/2004 | Williams |
| 6,756,695 B2 | 6/2004 | Hibbs et al. |
| 6,770,987 B1 | 8/2004 | Sogard et al. |
| 6,777,851 B2 | 8/2004 | Maslov |
| 6,806,586 B2 | 10/2004 | Wobben |
| 6,840,713 B1 | 1/2005 | Schia et al. |
| 6,843,191 B1 | 1/2005 | Makotinsky |
| 6,857,821 B2 | 2/2005 | Steenhuis et al. |
| 6,956,300 B2 * | 10/2005 | Gizara .................. F03B 17/061 |
| | | 290/42 |
| 6,957,947 B2 | 10/2005 | Williams |
| 7,190,087 B2 | 3/2007 | Williams |
| D543,495 S | 5/2007 | Williams |
| 7,223,137 B1 | 5/2007 | Sosnowski |
| 7,275,891 B2 | 10/2007 | Owen et al. |
| 7,352,078 B2 | 4/2008 | Gehring |
| 7,378,750 B2 | 5/2008 | Williams |
| 7,425,772 B2 | 9/2008 | Novo Vidal |
| 7,471,009 B2 | 12/2008 | Davis et al. |
| 7,527,006 B2 | 5/2009 | Khachaturian |
| 7,611,307 B2 | 11/2009 | Owen et al. |
| 7,736,127 B1 * | 6/2010 | Carr .................. F03B 3/06 |
| | | 290/54 |
| 7,845,296 B1 | 12/2010 | Khachaturian |
| 7,859,128 B2 * | 12/2010 | Gibberd ................ F03B 13/264 |
| | | 290/43 |
| 7,874,788 B2 | 1/2011 | Stothers et al. |
| 7,972,108 B2 * | 7/2011 | Fonkenell ............... F03B 3/126 |
| | | 415/121.1 |
| 7,976,245 B2 | 7/2011 | Finnigan |
| 8,022,581 B2 | 9/2011 | Stiesdal |
| 8,106,527 B1 * | 1/2012 | Carr ................. F03B 13/00 |
| | | 290/54 |
| 8,308,422 B2 | 11/2012 | Williams |
| 8,310,077 B2 | 11/2012 | Pearce |
| 8,350,400 B2 | 1/2013 | Rosefsky |
| 8,466,595 B2 | 6/2013 | Spooner |
| 8,784,005 B2 * | 7/2014 | Ives ................. H02G 1/10 |
| | | 405/169 |
| 9,054,512 B2 * | 6/2015 | Ives ................. H02G 1/10 |
| 2002/0034437 A1 | 3/2002 | Williams |
| 2002/0062644 A1 | 5/2002 | Rosefsky |
| 2002/0088222 A1 | 7/2002 | Vauthier |
| 2003/0044272 A1 | 3/2003 | Addie et al. |
| 2003/0137149 A1 | 7/2003 | Northrup et al. |
| 2003/0155829 A1 | 8/2003 | McMullen et al. |
| 2003/0168864 A1 | 9/2003 | Heronemus et al. |
| 2003/0193198 A1 | 10/2003 | Wobben |
| 2003/0218338 A1 | 11/2003 | O'Sullivan et al. |
| 2004/0021386 A1 | 2/2004 | Swett |
| 2004/0021437 A1 | 2/2004 | Maslov et al. |
| 2004/0201299 A1 | 10/2004 | Naritomi et al. |
| 2004/0227500 A1 | 11/2004 | O'Meara |
| 2004/0232792 A1 | 11/2004 | Enfourth |
| 2004/0262926 A1 | 12/2004 | Hansen |
| 2005/0005592 A1 | 1/2005 | Fielder |
| 2005/0031442 A1 | 2/2005 | Williams |
| 2006/0261597 A1 | 11/2006 | Gehring |
| 2007/0018459 A1 | 1/2007 | Williams |
| 2007/0063448 A1 | 3/2007 | Kowalczyk |
| 2007/0164626 A1 | 7/2007 | Taniguchi et al. |
| 2007/0231072 A1 | 10/2007 | Jennings et al. |
| 2007/0241566 A1 | 10/2007 | Kuehnle |
| 2007/0262668 A1 | 11/2007 | Brisson et al. |
| 2007/0291426 A1 | 12/2007 | Kasunich et al. |
| 2008/0012345 A1 | 1/2008 | Parker |
| 2008/0012538 A1 | 1/2008 | Stewart et al. |
| 2009/0278357 A1 | 11/2009 | Williams |
| 2010/0025998 A1 | 2/2010 | Williams |
| 2010/0026002 A1 | 2/2010 | Spooner et al. |
| 2010/0068037 A1 | 3/2010 | Ives et al. |
| 2010/0133838 A1 | 6/2010 | Borgen |
| 2010/0172698 A1 | 7/2010 | Ives et al. |
| 2010/0201129 A1 | 8/2010 | Holstein et al. |
| 2010/0232885 A1 * | 9/2010 | Ives .................. E02D 15/08 |
| | | 405/204 |
| 2010/0295388 A1 | 11/2010 | Ives et al. |
| 2011/0018274 A1 | 1/2011 | Ives et al. |
| 2011/0088253 A1 | 4/2011 | Ives et al. |
| 2011/0110770 A1 | 5/2011 | Spooner et al. |
| 2011/0291419 A1 | 12/2011 | Dunne et al. |
| 2011/0293399 A1 | 12/2011 | Dunne et al. |
| 2011/0298216 A1 | 12/2011 | Ives et al. |
| 2011/0304148 A1 | 12/2011 | Dunne et al. |
| 2012/0027522 A1 | 2/2012 | Ives et al. |
| 2012/0175877 A1 | 7/2012 | Ives et al. |
| 2012/0187680 A1 | 7/2012 | Spooner et al. |
| 2012/0211988 A1 * | 8/2012 | Harding .............. F03B 3/126 |
| | | 290/54 |
| 2012/0235412 A1 | 9/2012 | Dunne et al. |

(56) References Cited

U.S. PATENT DOCUMENTS

| | | |
|---|---|---|
| 2012/0280506 A1 | 11/2012 | Dunne et al. |
| 2013/0343869 A1 | 12/2013 | Ives et al. |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 2088311 | 8/2009 |
| EP | 2110910 | 10/2009 |
| EP | 2112370 | 10/2009 |
| EP | 1980745 B1 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2209175 B1 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | WO9844372 | 10/1998 |
| WO | WO9852819 | 11/1998 |
| WO | WO9966623 | 12/1999 |
| WO | WO0077393 | 12/2000 |
| WO | WO 0134973 | 5/2001 |
| WO | WO0134977 | 5/2001 |
| WO | WO02099950 | 12/2002 |
| WO | WO03014561 | 2/2003 |
| WO | WO03025385 | 3/2003 |
| WO | WO03046375 | 6/2003 |
| WO | WO2004015264 | 2/2004 |
| WO | WO2004027257 | 4/2004 |
| WO | WO2004107549 | 12/2004 |
| WO | WO2004113717 | 12/2004 |
| WO | WO2005045243 | 5/2005 |
| WO | WO2005061887 | 7/2005 |
| WO | WO2005078233 | 8/2005 |
| WO | WO2005080789 | 9/2005 |
| WO | WO2005116443 | 12/2005 |
| WO | WO2006029496 | 3/2006 |
| WO | WO2007043894 | 4/2007 |
| WO | WO2007055585 | 5/2007 |
| WO | WO2007083105 | 7/2007 |
| WO | WO2007086814 | 8/2007 |
| WO | WO2007125349 | 11/2007 |
| WO | WO2008004877 | 1/2008 |
| WO | WO2008006614 | 1/2008 |
| WO | WO2008050149 | 5/2008 |
| WO | WO2008081187 | 7/2008 |
| WO | WO2008127114 | 10/2008 |
| WO | WO2009/016409 | 2/2009 |
| WO | WO2010118766 | 10/2010 |
| WO | WO2011039249 | 4/2011 |
| WO | WO2011039255 | 4/2011 |
| WO | WO2011039267 | 7/2011 |
| WO | 2012062739 A1 | 5/2012 |

* cited by examiner

HYDROELECTRIC TURBINE TESTING METHOD

FIELD OF THE INVENTION

The present invention is concerned with a hydroelectric turbine testing method that permits the turbine to be tested before being finally deployed onto the seabed, by simulating the tidal flow of water through the turbine.

BACKGROUND OF THE INVENTION

The increased interest in environmental awareness, and a reluctance to rely on non-renewable sources of energy, has led to greater usage of renewable energy systems, e.g. solar power, wind power, thermal power, and tidal power. The latter involves the installation of turbine generators in an area of tidal flow, and converts the energy of the tides into electrical energy.

Such hydroelectric turbine generators are positioned in an area of tidal flow, such that the motion of the seawater through the generator acts on blades, resulting in rotation of a rotor within a stator. The motion of the magnets relative to the coils of the stator causes the magnetic field generated by the magnets to induce an EMF in each of the coils. These induced EMFs provide the electrical power output from the turbine generator.

Harnessing tidal energy presents significant challenges with respect to maintenance of the turbine in order to ensure continuing and efficient operation in the harsh submarine environment. The installation and decommissioning of submarine turbine generators is relatively expensive, and it is not economic to carry out regular maintenance on the various components in the system.

In addition, in order to be economically viable these turbines must be built at a large scale. As a result the turbines and associated bases/supports are large and heavy components, and require significant lifting and transport equipment in order to achieve deployment. The use of such heavy lifting equipment is normally a hazardous undertaking, and is rendered even more dangerous when this equipment is operated at sea.

The installation process is further complicated by a shortage in the market of suitable vessels and equipment to perform such work and the extreme danger of engaging divers in high tidal flow sites.

Therefore, it is an object of the invention to provide a method of testing a hydroelectric turbine before the turbine is installed and secured on the seabed, in order to ensure that the turbine is operating as expected. This will then reduce the likelihood of having to unexpectedly retrieve the hydroelectric turbine from the seabed in the event of a fault occurring, which as stated above is a costly, time consuming, and technically challenging operation.

SUMMARY OF THE INVENTION

According to the present invention there is provided a method of testing a hydroelectric turbine comprising a stator and a rotor housed for rotation within the stator, the method comprising the steps of:
securing the turbine to a transport vessel;
transporting the turbine and vessel to open water;
locating the turbine such that at least the rotor is submerged; and displacing the transport vessel and turbine through the water in order to effect rotation of the rotor.

Preferably, the method comprises the step of securing the turbine beneath the transport vessel prior to transporting the turbine to open water.

Preferably, the method comprises the step of lowering the turbine away from the vessel prior to the step of displacing the vessel and turbine through the water.

Preferably, the method comprises the step of recording and/or analysing operational data from the turbine as the vessel and turbine are displaced through the water.

Preferably, the method comprises the step of wirelessly transmitting the operational data from the turbine to a data recorder/analyser.

Preferably, the method comprises the step of varying the velocity at which the turbine is towed through the water.

Preferably, the method comprises, in the step of varying the velocity, varying the velocity to simulate the variation in tidal velocity likely to be experienced by the turbine during use.

Preferably, the method comprises, in the step of displacing the turbine through the water, displacing the turbine through the water in a first direction and subsequently displacing the turbine through the water in a second direction opposite to the first direction.

Preferably, the method comprises, in the step of displacing the transport vessel and turbine through the water in order to effect rotation of the rotor, displacing the vessel and turbine without an electrical load connected to the turbine.

Preferably, the method comprises, in the step of displacing the transport vessel and turbine through the water in order to effect rotation of the rotor, displacing the vessel and turbine with an electrical load connected to the turbine.

Preferably, the method comprises the step of analysing the operational data to determine the relationship between the velocity of the water flow through the turbine and one or more operating parameters of the turbine.

Preferably, the method comprises the step of analysing the operational data to determine the relationship between the velocity of the water flow through the turbine and the angular velocity of the rotor.

Preferably, the method comprises the step of analysing the operational data to determine the relationship between the velocity of the water flow through the turbine and the power generated by the turbine.

Preferably, the method comprises the step of analysing the operational data to determine the relationship between the velocity of the water flow through the turbine and the electrical characteristics of the turbine.

Preferably, the method comprises the step of securing the turbine and base to the vessel with a plurality of main lines and corresponding secondary lines.

DETAILED DESCRIPTION OF THE DRAWINGS

Figure 1:
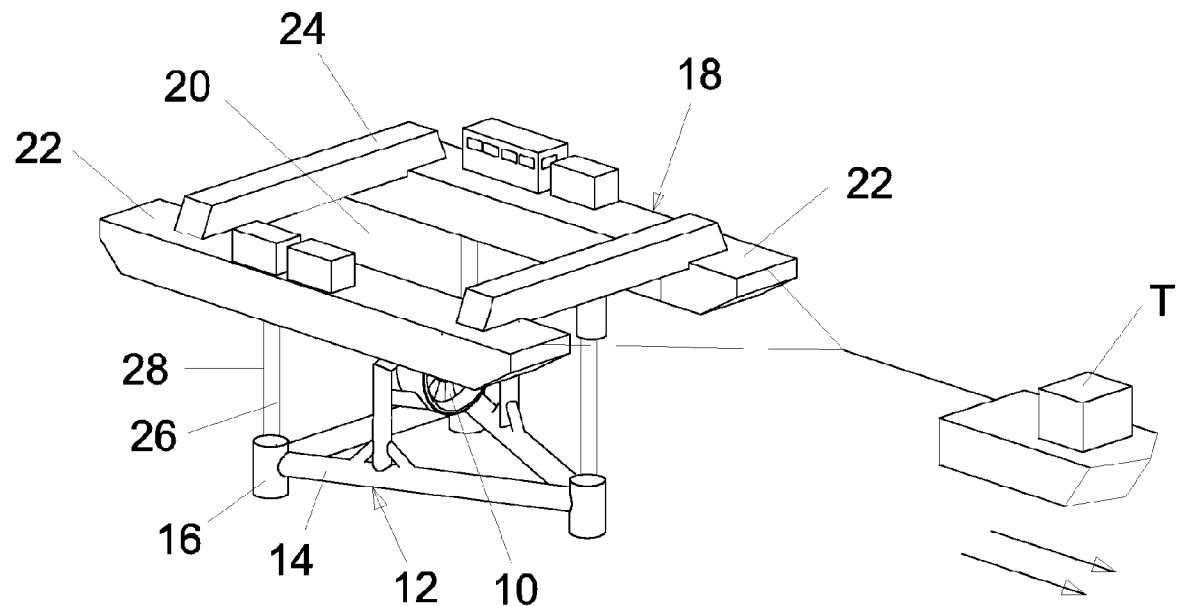
FIG. 1 illustrates a perspective view of a base mounted hydroelectric turbine suspended beneath a deployment vessel.
Figure 2:
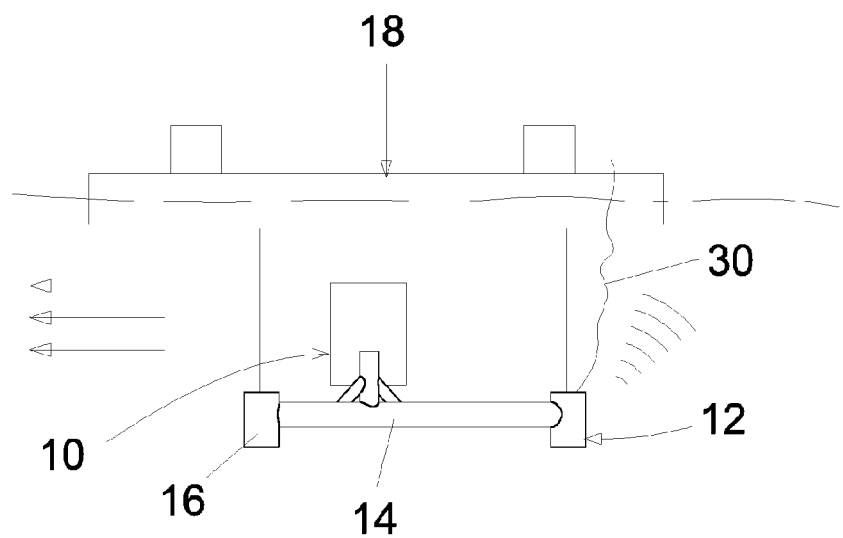
FIG. 2 illustrates a side elevation of the arrangement illustrated in FIG. 1.

Referring now to the accompanying drawings, there is described and shown a method for testing a hydroelectric turbine 10 which, in the embodiment illustrated, is mounted to a base 12 via which, in use, the turbine 10 is located and secured in position on the seabed in known fashion. The method of the invention, as will become apparent, allows the hydroelectric turbine 10 to undergo operational simulation and testing before the turbine 10 is finally deployed on the seabed, thus ensuring that the turbine 10 is operating as expected before undertaking the final seabed deployment process.

In the embodiment illustrated the base 12 comprises a triangular frame 14 having three legs 16, although it will be understood from the following description of the method of the invention that the base 12 is an exemplary embodiment and could be of any other shape and/or configuration.

In order to perform the testing of the turbine 10, the base 12 and turbine 10 are mounted beneath a vessel 18, which is preferably the same vessel that will be used in the final seabed deployment of the turbine 10 and base 12. Thus before the testing can commence it is first necessary to install the turbine 10 and base 12 is position on the vessel 18. This may be achieved in a number of ways, depending for example on the equipment available locally. It will also be appreciated that the turbine 10 need not be mounted directly beneath the vessel, and could be located in any other suitable location and/or orientation that will permit the turbine 10 to be positioned in the water for the purposes of testing as described hereinafter.

The vessel 18 is provided with load bearing means in the form of winches (not shown), each of which can be used to raise the base 12 into a position beneath the vessel 18 such that the turbine 10 projects through a portal 20 defined between a pair of pontoons 22 and cross members 24 of the vessel 18. During testing, the base 12 is preferably secured to the vessel 18, at each leg 16, by a pair of lines, a main line 26 and a tow test backup line 28. The main lines 26 are each wound onto the respective winch (not shown) and are thus used to lower the turbine 10 and base 12 away from the vessel 14 to the required depth for testing. The tow test backup lines 28 are preferably connected between a fixed point on the vessel 18 and a suitable location on the base 12, for example the respective leg 16, and are of a length such as to be at full extension when the turbine 10 and base 12 are at the correct testing depth. However, the primary load of the turbine 10 and base 12 is borne by the main lines 26, with a fraction of the load being transferred onto the tow test backup lines 28. In this way the tow test backup lines 28 will be under tension, and will be fully extended. Thus in the event of a failure of one or more of the main lines 26, the turbine 10 and base 12 will be supported by the fully extended tow test backup lines 28 and will therefore remain at the same depth. As the tow test backup lines 28 are already in tension there should be little to no "bounce back" on the tow test backup lines 28 in the event of failure of one or more of the main lines 26.

With the base 12 safely secured beneath the vessel 18, the vessel 18 and turbine 10 can be transported to open water to begin testing. To this end, the vessel 18 may contain its own source of propulsion, but in the embodiment illustrated is tethered to a tug T as illustrated in FIG. 1, which can then be used to tow the vessel 18 and the turbine 10 out to open water.

Once the vessel 18 is in open water, the winches (not shown) are then used to lower the base 12 and turbine 10 away from the vessel 18, such that the turbine 10 is fully submerged, and preferably a suitable distance beneath the underside of the vessel 18 in order to reduce or eliminate interference from turbulence generated by the vessel 18 which might otherwise effect the results obtained. The turbine 10 is preferably lowered away from the vessel 18 while the vessel 18 is stationary, although it will of course be understood that the turbine 10 could be lowered while the vessel 18 is in motion. The tug T can then be used to tow the vessel 18, and therefore the submerged turbine 10, through the water at a desired speed in order to test the operation of the turbine 10. For example the vessel 18 may be towed through the water at 2 to 3 knots, while the operation of the turbine 10 is monitored. This speed can be varied to simulate the prevailing conditions at the site at which the turbine 10 and base 12 will ultimately be deployed.

In addition, during testing the turbine 10 may be displaced through the water in a first direction, while monitoring various operating parameters, and then displaced through the water in a second direction opposite to the first direction, in order to simulate the reversal of tidal flow that the turbine 10 will experience when finally deployed on the seabed. The change from the first direction to the second direction may be made in a manner which will closely approximate the change in the direction of tidal flow that the turbine 10 will experience.

During the testing, the turbine 10, and in particular power terminals (not shown) therefore may be left open circuit, or may be connected to an electrical load in order to allow the turbine 10 to generate electricity, thereby simulating the final seabed mounted operation of the turbine 10. The electrical load may be located on the turbine 10, the base 12, vessel 18, or at any other suitable location.

It is thus preferable that telemetry and other operational data, such as electrical characteristics/power output from the turbine 10, rotational or angular velocity of the rotor of the turbine 10, etc are analysed and/or recorded as the vessel 18 and turbine 10 are displaced through the water. The vessel 18 may therefore be provided with suitable equipment to permit this monitoring/recording of the operational data. A data connection is therefore provided between the turbine 10 and/or base 12 and said analysing/recording equipment. This data connection may be via a physical cable 30 or through a wireless connection such as subsea acoustic modem (not shown).

Thus by displacing the turbine 10 through the water it is possible to simulate the tidal flow of water through the turbine 10, and at various speeds such as to simulate the variation in tidal speeds that will be experienced by the turbine 10 under normal operating conditions. The testing can thus provide useful information such as the start up speed of the turbine 10, the power generation at various water velocities through the turbine 10, and the stopping speed/time of the turbine 10 when the vessel 18 is brought to a standstill. It is then possible to analyse this data in order to determine the relationship between the velocity of the water flow through the turbine 10 and one or more operating parameters of the turbine 10. The testing may also reveal other issue regarding the operation of the turbine 10, such as the hydrodynamic behaviour of the water flowing through and about the turbine 10, which information may be beneficial, whether during the final deployment and continuing operation of the turbine 10, or for other purposes.

It will thus be appreciated that the method of the present invention provides a means of testing large hydroelectric turbines 10 before committing to a full seabed installation.

The invention claimed is:
1. A method of testing a hydroelectric turbine comprising a stator and a rotor housed for rotation within the stator, the method comprising the steps of:
  securing the turbine to a transport vessel;
  transporting the turbine and vessel to open water;
  locating the turbine such that at least the rotor is submerged;
  and displacing the transport vessel and turbine through the water in order to effect rotation of the rotor.

2. A method according to claim 1, comprising the step of securing the turbine beneath the transport vessel prior to transporting the turbine to open water.

3. A method according to claim 1 comprising the step of lowering the turbine away from the vessel prior to the step of displacing the vessel and turbine through the water.

4. A method according to claim 1 comprising the step of recording and/or analysing operational data from the turbine as the vessel and turbine are displaced through the water.

5. A method according to claim 4 comprising the step of analysing the operational data to determine the relationship between the velocity of the water flow through the turbine and one or more operating parameters of the turbine.

6. A method according to claim 4 comprising the step of analysing the operational data to determine the relationship between the velocity of the water flow through the turbine and the angular velocity of the rotor.

7. A method according to claim 4 comprising the step of analysing the operational data to determine the relationship between the velocity of the water flow through the turbine and the power generated by the turbine.

8. A method according to claim 4 comprising the step of analysing the operational data to determine the relationship between the velocity of the water flow through the turbine and the electrical characteristics of the turbine.

9. A method according to claim 1 comprising the step of wirelessly transmitting the operational data from the turbine to a data recorder/analyser.

10. A method according to claim 1 comprising the step of varying the velocity at which the turbine is towed through the water.

11. A method according to claim 10 comprising, in the step of varying the velocity, varying the velocity to simulate the variation in tidal velocity likely to be experienced by the turbine during use.

12. A method according to claim 1 comprising, in the step of displacing the turbine through the water, displacing the turbine through the water in a first direction and subsequently displacing the turbine through the water in a second direction opposite to the first direction.

13. A method according to claim 1 comprising, in the step of displacing the transport vessel and turbine through the water in order to effect rotation of the rotor, displacing the vessel and turbine without an electrical load connected to the turbine.

14. A method according to of claim 1 comprising, in the step of displacing the transport vessel and turbine through the water in order to effect rotation of the rotor, displacing the vessel and turbine with an electrical load connected to the turbine.

15. A method according to claim 1 comprising the step of securing the turbine and base to the vessel with a plurality of main lines and corresponding secondary lines.

* * * * *